(12) United States Patent
Seok et al.

(10) Patent No.: US 9,258,824 B2
(45) Date of Patent: *Feb. 9, 2016

(54) METHOD OF REDUCING INTERFERENCE BETWEEN STATIONS IN WIRELESS LAN SYSTEM, AND APPARATUS SUPPORTING THE SAME

(71) Applicant: LG ELECTRONICS INC., Seoul (KR)

(72) Inventors: Yong Ho Seok, Anyang-si (KR); Yu Jin Noh, Anyang-si (KR); Bong Hoe Kim, Anyang-si (KR); Dae Won Lee, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/629,985

(22) Filed: Feb. 24, 2015

(65) Prior Publication Data

US 2015/0181613 A1    Jun. 25, 2015

Related U.S. Application Data

(63) Continuation of application No. 13/515,266, filed as application No. PCT/KR2010/005462 on Aug. 18, 2010, now Pat. No. 8,995,342.

(60) Provisional application No. 61/287,203, filed on Dec. 17, 2009.

(51) Int. Cl.
*H04W 72/04* (2009.01)
*H04W 72/08* (2009.01)
(Continued)

(52) U.S. Cl.
CPC .......... *H04W 72/082* (2013.01); *H04W 72/046* (2013.01); *H04W 28/048* (2013.01); *H04W 48/16* (2013.01); *H04W 84/12* (2013.01); *H04W 88/08* (2013.01)

(58) Field of Classification Search
None
See application file for complete search history.

(56) References Cited

U.S. PATENT DOCUMENTS

| 7,893,871 B1 | 2/2011 | Lee et al. |
| 8,385,968 B2 | 2/2013 | Kim et al. |

(Continued)

FOREIGN PATENT DOCUMENTS

| KR | 10-2003-0018051 | 3/2003 |
| KR | 10-2009-0031434 | 3/2009 |

OTHER PUBLICATIONS

Murad Abusubaih et al., "A Framework for Interference Mitigation in Multi-BSS 802.11 Wireless LANs", Proceedings of 10th IEEE International Symposium in a World of Wireless, Mobile and Multimedia Networks, Jun. 2009.

(Continued)

*Primary Examiner* — Steve Young
(74) *Attorney, Agent, or Firm* — Lee, Hong, Degerman, Kang & Waimey

(57) ABSTRACT

An interference avoidance method performed by an Access Point (AP) in a WLAN system in an Overlapping Basic Service Set (OBSS) environment is provided. The interference avoidance method includes receiving an interference avoidance request message from the first STA, the interference avoidance request message informing that frame transmission of the AP acts as interference with a first STA; transmitting an interference avoidance response message in response to the interference avoidance request message; obtaining first channel information about a first channel between the first STA and the AP from the first STA which has received the interference avoidance response message; determining a transmitting steering matrix based on the first channel information; and transmitting data to a second STA by performing beamforming according to the transmitting steering matrix.

6 Claims, 8 Drawing Sheets

(51) Int. Cl.
  *H04W 28/04* (2009.01)
  *H04W 48/16* (2009.01)
  *H04W 84/12* (2009.01)
  *H04W 88/08* (2009.01)

(56) References Cited

U.S. PATENT DOCUMENTS

| | | | |
|---|---|---|---|
| 8,737,307 | B2 | 5/2014 | Kim et al. |
| 2003/0123405 | A1 | 7/2003 | del Prado et al. |
| 2007/0232235 | A1* | 10/2007 | Li .................. H04W 28/18 455/63.1 |
| 2007/0298742 | A1 | 12/2007 | Ketchum et al. |
| 2008/0014870 | A1 | 1/2008 | Kim |
| 2008/0019329 | A1 | 1/2008 | Benveniste |
| 2008/0064432 | A1* | 3/2008 | Park et al. ................ 455/522 |
| 2009/0046570 | A1 | 2/2009 | Sarkar et al. |
| 2009/0046800 | A1 | 2/2009 | Xu et al. |
| 2009/0181691 | A1 | 7/2009 | Kotecha et al. |
| 2009/0286482 | A1 | 11/2009 | Gorokhov et al. |
| 2010/0248635 | A1* | 9/2010 | Zhang et al. .............. 455/63.1 |
| 2011/0150004 | A1* | 6/2011 | Denteneer ............ H04L 5/0023 370/476 |
| 2011/0150132 | A1 | 6/2011 | Kim et al. |
| 2014/0348082 | A1* | 11/2014 | Pare, Jr. ............... H04B 7/0452 370/329 |

OTHER PUBLICATIONS

Li Zheng et al., "Overlapping Impacts and Resource Coordination for High-density Wireless Communication", Proceedings of International Conference on Computing and Communication Technologies, Jul. 2009.

* cited by examiner

METHOD OF REDUCING INTERFERENCE BETWEEN STATIONS IN WIRELESS LAN SYSTEM, AND APPARATUS SUPPORTING THE SAME

CROSS-REFERENCE TO RELATED APPLICATIONS

This application is a continuation of U.S. patent application Ser. No. 13/515,266, filed on Jun. 11, 2012, now U.S. Pat. No. 8,995,342, which is the National Stage filing under 35 U.S.C. 371 of International Application No. PCT/KR2010/005462, filed on Aug. 18, 2010, which claims the benefit of U.S. Provisional Application No. 61/287,203, filed on Dec. 17, 2009, the contents of which are all incorporated by reference herein in their entirety.

TECHNICAL FIELD

The present invention relates to wireless communication and, more particularly, to a method of reducing interference between stations in a wireless local area network system in an OBSS environment and an apparatus for supporting the same.

BACKGROUND ART

With the recent development of information communication technology, a variety of wireless communication techniques are being developed. From among them, a Wireless Local Area Network (WLAN) is a technique for wirelessly accessing the Internet at homes or companies or in specific service providing areas by using portable terminals, such as a Personal Digital Assistant (PDA), a laptop computer, and a Portable Multimedia Player (PMP), based on wireless frequency technology.

A lot of standardization tasks are being performed since Institute of Electrical and Electronics Engineering (IEEE) 802 (i.e., the standardization organization of WLAN technology) was established on February, 1980.

WLAN technology initially supported a speed of 1 to 2 Mbps through frequency hopping, band spreading, and infrared communication by using a frequency of 2.4 GHz according to IEEE 802.11, but recently may support a maximum speed of 54 Mbps by using Orthogonal Frequency Division Multiplexing (OFDM). In addition, in IEEE 802.11, standardizations for various techniques, such as the improvement of Quality of Service (QoS), Access Point (AP) protocol compatibility, security enhancement, radio resource measurement, wireless access vehicular environments, fast roaming, a mesh network, interworking with an external network, and wireless network management, are being put to practical use or developed.

Furthermore, in order to overcome a limit to the communication speed that was considered as being weakness in the WLAN, IEEE 802.11n has recently been established as a technical standard. An object of IEEE 802.11n is to increase the speed and reliability of a network and to extend the coverage of a wireless network. More particularly, in order to support a High Throughput (HT) having a maximum data processing speed of 540 Mbps or higher, minimize an error in transmission, and optimize the data speed, IEEE 802.11n is based on Multiple Inputs and Multiple Outputs (MIMO) technology using multiple antennas on both sides of a transmitter and a receiver. For a necessity for high quality and broadband data transmission according to increased users and in order to reduce transmit power, use radio resources efficiently, and extend the service coverage, the IEEE 802.11n standard supports beamforming technology and data transmission through a maximum of four spatial streams. Furthermore, this standard may use not only a coding scheme for transmitting several redundant copies in order to increase data reliability, but also Orthogonal Frequency Division Multiplex (OFDM) in order to increase the speed.

As the WLAN is actively propagated and applications employing the WLAN are diversified, WLAN service coverage is increasing. As hotspots providing WLAN service increases, an Overlapping Basic Service Set (OBSS) environment in which all or part of Basic Service Areas (BSA), that is, the service coverages of the hotspots overlap with each other is increasing. A station operating in the OBSS environment is influenced by a neighboring Basic Service Set (BSS) that forms the OBSS. Reliability of data transmission and the throughput of a WLAN system may be deteriorated because the transmission/reception of data in the neighboring BSS acts as interference. Accordingly, in data transmission/reception between STAs including an AP operating in an OBSS environment, a transmission/reception method for minimizing mutual interference and a protocol for the transmission/reception method need to be taken into consideration.

DISCLOSURE

Technical Problem

An object of the present invention is to provide a method of reducing interference occurring due to the data transmission/reception of a neighboring BSS that forms an OBSS in a WLAN system in an OBSS environment in which all or part of the service coverages of two or more BSSs overlap with each other and an apparatus for supporting the same.

Technical Solution

In an aspect, an interference avoidance method performed by an Access Point (AP) in a WLAN system in an Overlapping Basic Service Set (OBSS) environment is provided. The interference avoidance method includes: receiving an interference avoidance request message from the first STA, the interference avoidance request message informing that frame transmission of the AP acts as interference with a first STA; transmitting an interference avoidance response message in response to the interference avoidance request message; obtaining first channel information about a first channel between the first STA and the AP from the first STA which has received the interference avoidance response message; determining a transmitting steering matrix based on the first channel information; and transmitting data to a second STA by performing beamforming according to the transmitting steering matrix.

The first STA may be an AP or non-AP STA of a neighboring BSS forming the OBSS.

The step of obtaining the first channel information may include receiving a sounding PLOP Protocol Data Unit (PPDU) from the first STA; and estimating the channel using the sounding PPDU.

The sounding PPDU may be a steered sounding PPDU and the steered sounding PPDU may be precoded using a receiving matrix obtained by decomposing a channel between the first STA and a third STA, the third STA sending a frame to the first STA.

The step of obtaining the first channel information may include receiving channel information about the first channel which is transmitted by the first STA as data.

The step of obtaining the first channel information may include receiving a covariance value of a channel between the first STA and a third STA from the first STA, the third STA sending a frame to the first STA.

The interference avoidance response message may include at least one field among: status field indicating a reception state of the interference avoidance request message; a capability field indicating whether interference avoidance capability exists or not; and a training request field indicating whether a sounding frame is requested to be transmitted for estimating the first channel between the first STA and the AP.

Advantageous Effects

In a station operating in an area where the service coverages of BSSs forming an OBSS overlap with each other, an influence resulting from the transmission/reception of data in a neighboring BSS can be reduced. Furthermore, reliable data transmission is possible using relatively low transmit power, and the throughput of a WLAN system can be improved.

MODE FOR INVENTION

Embodiments of the present invention will be described in detail below with reference to the accompanying drawings.

A Wireless Local Area Network (WLAN) system in which an embodiment of the present invention is implemented includes at least one Basic Service Set (BSS). The BSS is a set of stations (STAs) successfully synchronized with each other for mutual communication. The BSS may be divided into an independent BSS (IBSS) and an infrastructure BSS.

A BSS includes at least one STA and at least one Access Point (AP). An AP is a functional entity for providing connection to each of STAs within a BSS through a wireless medium. The AP may also be called another terminology, such as a centralized controller, a Base Station (BS), and a scheduler.

An STA is a specific functional entity, including a Medium Access Control (MAC) and a wireless-medium physical layer (PHY) interface to satisfy the IEEE 802.11 standard. The STA may be an AP STA or a non-AP STA, but it refers to a non-AP STA unless described otherwise hereinafter. The STA may also be called another terminology, such as User Equipment (UE), a Mobile Station (MS), a Mobile Terminal (MT), a portable device, or an interface card.

Figure 1:
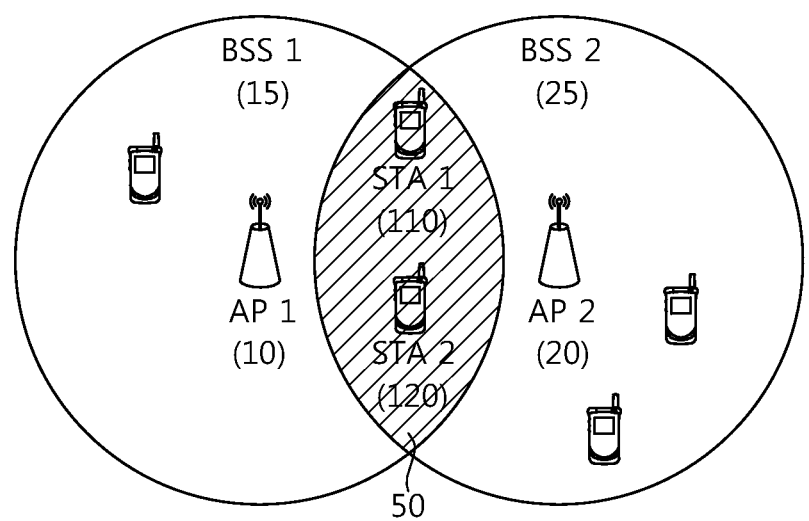
FIG. 1 shows an example of an OBSS environment to which the present invention may be applied.

FIG. 1 shows an example of an OBSS environment to which the present invention may be applied.

Referring to FIG. 1, a BSS 1(15) and a BSS 2(25) form an OBSS in which the service coverages of the BSS 1(15) and the BSS 2(25) partially overlap with each other. As STA 1(110) and an STA 2(120) operating in an area where a Basic Service Area (BSA), that is, the service coverage of the BSS 1(15) and the BSA of the BSS 2(25) partially overlap with each other may be influenced by the AP 1(10) of the BSS 1(15) and the AP 2(20) of the BSS 2(25) at the same time. When the STA 1(110) receiving a frame with it associated with the AP 1(10), the AP 2(20) may send a frame to an STA associated therewith. At this time, the transmission of the frame by the AP 2(20) may act as interference with the STA 1(110). This is because the STA 1(110) is operated in an area where the BSA of the AP 1(10) and the BSA of the AP 2(20) overlap with each other, that is, an overlapped area 50. Another BSS forming an OBSS along with any BSS is hereinafter called a neighboring BSS. That is, in the example of FIG. 1, the BSS 2(25) is the neighboring BSS of the BSS 1(15). Likewise, the BSS 1(15) may be the neighboring BSS of the BSS 2(25).

If an AP is placed and operated within the BSA of another BSS forming an OBSS, this problem may become worse. In this situation, when the AP is operated, the transmission of a frame by an AP in another BSS (neighboring BSS) forming the OBSS environment may act as interference.

Accordingly, there is a need for a method of reducing interference resulting from the operation of an AP or STA in another BSS with which an AP or STA operating in an OBSS environment overlaps. An example of a condition that may occur in an OBSS environment and an embodiment of the present invention are described below.

Figure 2:
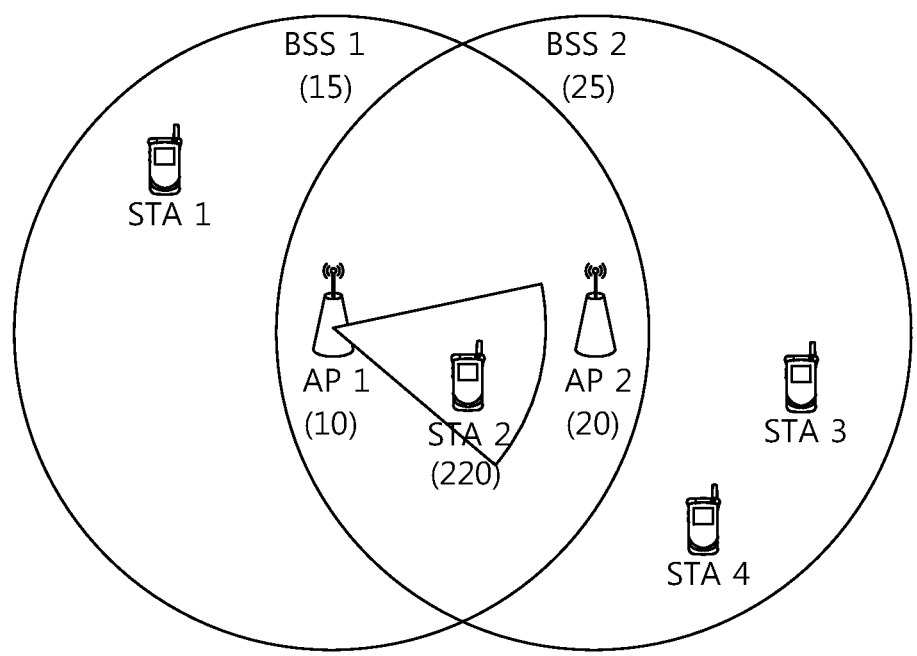
FIG. 2 is a diagram showing an example in which the APs of respective BSSs forming an OBSS environment are operated in an overlapped area.

FIG. 2 is a diagram showing an example in which the APs of respective BSSs forming an OBSS environment is operated in an overlapped area.

Figure 3:
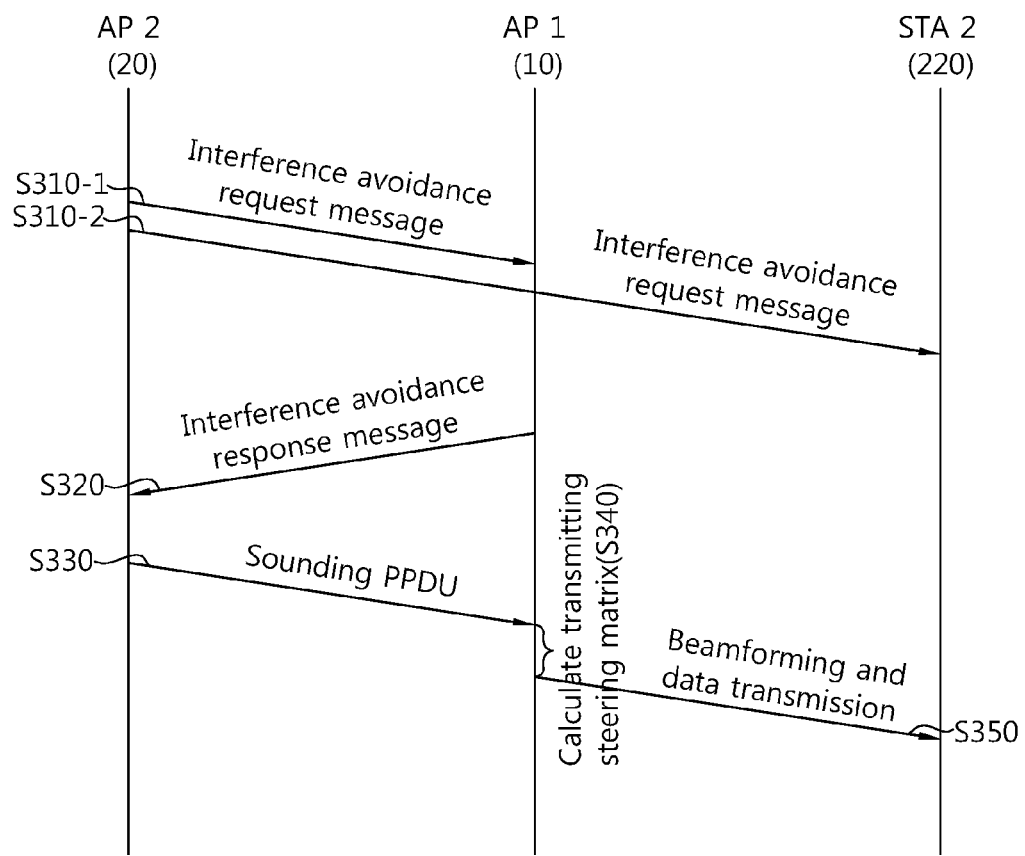
FIG. 3 is a message flowchart illustrating an interference avoidance procedure according to an embodiment of the present invention.

In the example of FIG. 2, the BSAs of a BSS 1(15) and a BSS 2(25) form an OBSS environment in which the BSAs are partially overlapped with each other. An AP 1(10) and an AP 2(20) are operated in an area where the BSAs of the BSS 1(15) and the BSS 2(25) are overlapped with each other, and an STA 2(220) is associated with the AP 1(10). Here, when the AP 1(10) sends a frame to the STA 2(220), this may act as interference with the AP 2(20). Even when the AP 1(10) performs transmission omni-directionally and when the AP 1 10 performs transmission using a directional antenna, if a beam is formed as in the example of FIG. 2, the transmission affects the AP 2(20). A process of forming a beam so that the transmission of a frame from the AP 1(10) to the STA 2(220) does not act as interference with the AP 2(20) and sending a frame is described below FIG. 3 is a message flowchart illustrating an interference avoidance procedure according to an embodiment of the present invention.

The AP 2(20) sends an interference avoidance request message to the AP 1(10) and the STA 2(220) in order to inform that the transmission of a frame from the AP 1(10) to the STA 2(220) acts as interference (S310-1 and S310-2). Or, the interference avoidance request message transmitted by the AP 2(20) may be broadcasted and transferred to all APs or non-AP STAs which are operated in the BSA of the BSS 2(25).

The interference avoidance request message may be a frame that is transmitted in order to prevent that the transmission/reception of a frame in a neighboring BSS acts as interference or that interference continues to act in the state in which the interference continues to act.

The AP 1(10) which has received the interference avoidance request message sends an interference avoidance response message in response to the interference avoidance request message. The interference avoidance response message may include a status field indicating the reception state of the interference avoidance request message, a capability field indicating whether interference avoidance capability exists or not, a training request field indicating whether a request to send a sounding frame for estimating a channel state with an AP or STA that has sent an interference avoidance request message has been made, and a filed indicating duration for which transmission to an STA is performed.

The AP 2(20) which has received the interference avoidance response message may send information about a channel between the AP 2(20) and the AP 1(10) to the AP 1(10). The transmission of the information about the channel to the AP 2(20) may be performed by sending information about the channel previously known by the AP 1(10) in a data form or may be performed by sending a sounding a Physical Layer Convergence Procedure (PLCP) Protocol Data Unit (PPDU) to the AP 2(20) (S330). The sounding PPDU is a PPDU that is used for a receiving STA to estimate a channel with a transmitting STA. The sounding PPDU is transmitted in the state in which a field (Not Sounding Field) indicating a sounding frame is set to 0 in the SIG field of a PLCP header. For the details of the frame format and function of the sounding PPDU, reference may be made to Paragraph 9.17 and Paragraph 20.3.13 of 'IEEE P802.11n/D11.0 Draft Standard for Information technology-Telecommunications and information exchange between systems-Local and metropolitan area networks-Specific requirements, Part 11: Wireless LAN Medium Access Control (MAC) and Physical Layer (PHY) Specifications, Amendment 5: Enhancements for Higher Throughput' disclosed on June, 2009.

The AP 1(10) estimates a channel between the AP 1(10) and the AP 2(20) by using the sounding PPDU transmitted by the AP 2(20) and obtains information about the channel. The AP 1(10) calculates a transmitting steering matrix for the STA 2(220) on the basis of the information about the channel (S340).

The transmitting steering matrix enables a beam, minimizing an influence on the AP 2(20), to be formed when the AP 1(10) sends data to the STA 2(220). In other words, the AP 1(10) forms a beam by using a steered transmitting steering matrix so that an influence on the AP 2(20) is minimized and sends data to the STA 2(220) (S350).

Consequently, the AP 1(10) forms a beam that has been steered to minimize an influence on the AP 2(20) and sends data to the STA 2(220). Thus, the AP 2(20) may receive data from an STA associated therewith while the AP 1(10) sends the data to the STA 2(220). In other words, in the state in which the downlink transmission of the AP 1(10) to the STA 2(220) and the uplink transmission of an STA associated with the AP 2(20) to the AP 2(20) have been minimized, the downlink transmission and the uplink transmission are performed at the same time. Accordingly, an overall throughput of a WLAN system can be improved.

The above example illustrates a method of an AP sending an interference avoidance request to the AP of another BSS in order to reduce interference that may occur in an OBSS environment, but an STA may send an interference avoidance request to an AP or STA affecting the transmission/reception of the relevant STA if necessary.

Figure 4:
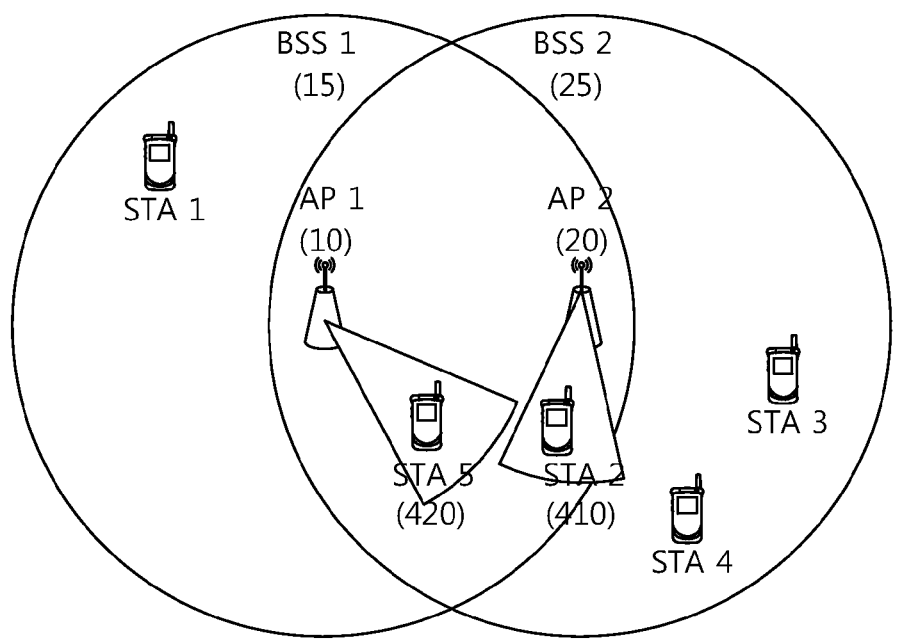
FIG. 4 schematically shows an OBSS environment to which another embodiment of the present invention may be applied.

FIG. 4 schematically shows an OBSS environment to which another embodiment of the present invention may be applied.

In an example of FIG. 4, the AP 1(10) of a BSS 1(15) sends data to an STA 5(420) associated therewith. At this time, it is assumed that an AP 2(20) and an STA 2(410) associated with the AP 2(20) are operating in the overlapped area of the BSA of the BSS 1(15) and the BSA of a BSS 2(25). If the AP 2(20) sends data to the STA 2(410) when the AP 1(10) sends data to the STA 5(420), the data transmission of the AP 1(10) acts as interference from a viewpoint of the STA 2(410).

Figure 5:
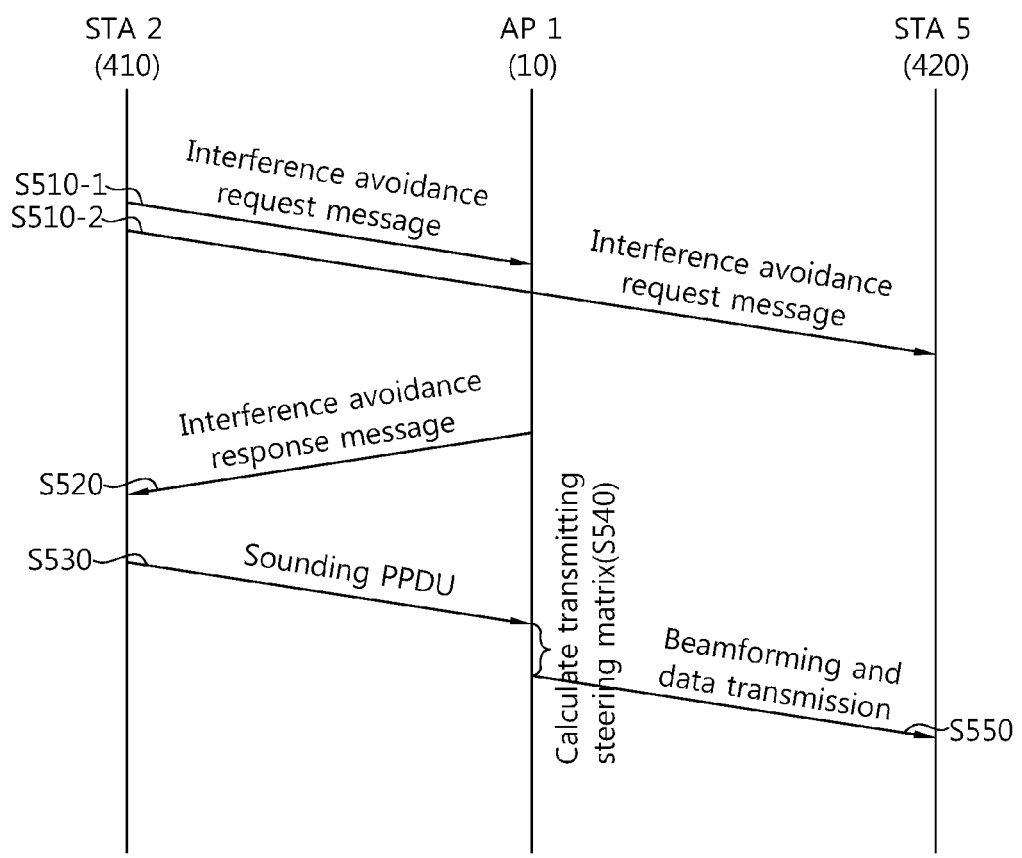
FIG. 5 is a message flowchart illustrating an interference avoidance procedure according to another embodiment of the present invention.

FIG. 5 is a message flowchart illustrating an interference avoidance procedure according to another embodiment of the present invention.

As in the example of FIG. 4, the STA 2(410) is associated with the AP 2(20) of the BSS 2(25), and it receives data from the AP 2(20). At this time, when the AP 1(10) of the BSS 1(15) sends data to the STA 5(420), it acts as interference from a viewpoint of the STA 2(410). Accordingly, the STA 2(410) has to inform the AP 1(10) that the transmission of the data from the AP 1(10) to the STA 5(420) may act as interference with the STA 2(410) and to request the AP 1(10) to perform steering for reducing the interference.

The STA 2(410) sends an interference avoidance request message (S510-1 and S510-2). The interference avoidance request message informs that the interference may affect the STA 2(410) and requests steering for interference avoidance. The interference avoidance request message may be unicasted or broadcasted.

A method of the STA 2(410) sending the interference avoidance request message to the AP 1(10) is as follows. A method of the STA 2(410) transferring the interference avoidance request message to the AP 1(10) through the AP 2(20) associated therewith, a method of the STA 2(410) broadcasting the interference avoidance request message and the AP 1(10) overhearing the broadcasted interference avoidance request message, and a method of the STA 2(410) sending the interference avoidance request message in which an RA is set as the MAC address of the AP 1(10) may exist.

The AP 1(10) receives the interference avoidance request message and sends an interference avoidance response message to the STA 2(410) in response thereto (S520).

The interference avoidance response message may include a status field indicating the reception state of the interference avoidance request message, a capability field indicating whether interference avoidance capability exists or not, a training request field indicating whether a request to send a sounding frame for estimating a channel state with an AP or STA that has sent an interference avoidance request message has been made, and a field indicating duration for which transmission to an STA is performed.

The STA 2(410) which has received the interference avoidance response message sends a sounding PPDU to the AP 1(10) (S530).

The AP 1(10) estimates a channel between the AP 1(10) and the STA 2(410) by using the sounding PPDU transmitted by the STA 2(410) and obtains information about the channel. The AP 1(10) calculates a transmitting steering matrix for the STA 2(220) on the basis of the information about the channel (S540).

The transmitting steering matrix enables a beam, minimizing an influence on the STA 2(410), to be formed when the AP 1(10) sends data to the STA 5(420).

In the interference avoidance procedures of FIGS. 3 and 5, when the transmission of data by an AP in a neighboring BSS acts as interference, an interference avoidance request message and an interference avoidance response message are exchanged with the AP in the neighboring BSS. Next, a sounding PPDU is transmitted to the AP of the neighboring BSS, the AP of the neighboring BSS obtains information about a channel, and a transmitting steering matrix to be used in beamforming is calculated on the basis of the information about the channel. The AP of the neighboring BSS performs beamforming and sends data according to the transmitting steering matrix so that the data transmission of the AP does not act as interference with an STA that has made the interference avoidance request.

When an AP1, an AP2, and an STA 2 are operated in an area where the BSAs of BSSs forming an OBSS are overlapped with each other, the RTS frame/CTS frame exchange procedure of IEEE 802.11 may be used as another example of a method for interference avoidance.

Figure 6:
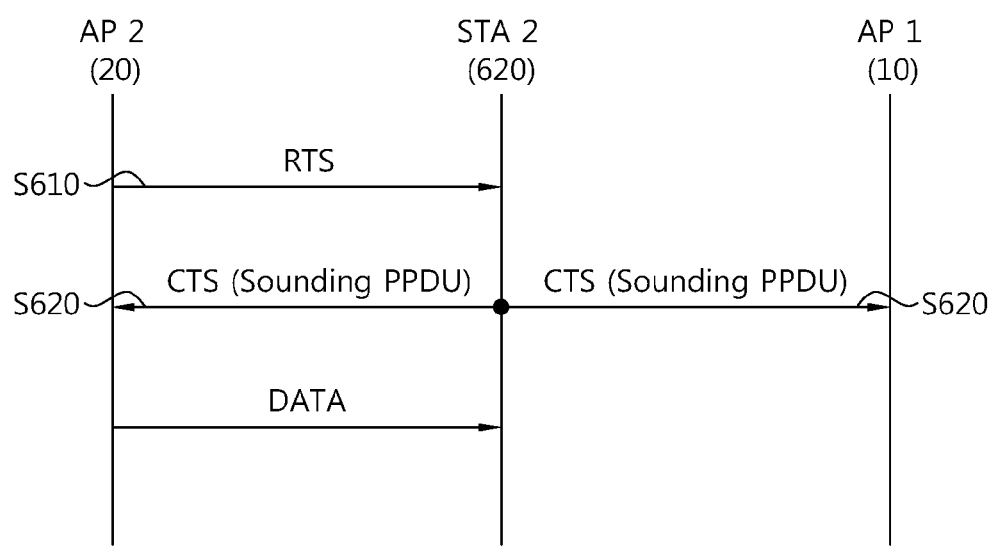
FIG. 6 is a message flowchart illustrating an interference avoidance procedure according to yet another embodiment of the present invention.

FIG. 6 is a message flowchart illustrating an interference avoidance procedure according to yet another embodiment of the present invention.

An example of FIG. 6 corresponds to an example in which, when the AP 2(20) sends data to an STA 2(620), the data transmission of the AP 2(20) acts as interference with the AP 1(10).

Prior to the transmission of the data to the STA 2(620), the AP 2 sends a Request To Send (RTS) frame informing the data transmission (S610).

The STA 2(620) which has received the RTS frame sends a Clear To Send (CTS) frame in response thereto (S620). Here, the CTS frame is transmitted in the form of a sounding PPDU and may be broadcasted. An STA which has received the CTS frame transmitted in the form of the sounding PPDU performs channel estimation by using the CTS frame and obtains information about a channel between the STA and the STA 2(620) that has transmitted the CTS frame.

In the example of FIG. 6, the AP 1(10) may overhear the CTS frame transmitted by the STA 2(620) and obtain information about a channel between the AP 1(10) and the STA 2(620) by estimating a channel. The AP 1(10) calculates a transmitting steering matrix so that the STA 2(620) is less influenced on the basis of the obtained information about the channel. The AP 1(10) forms a beam using the transmitting steering matrix obtained as described above so that the data transmission of the AP 1(10) influencing the STA 2(620) (as interference) is minimized and sends data.

In accordance with another embodiment of the present invention, the sounding PPDU transmitted in the examples of FIGS. 2 to 6 may be transmitted in the form of a steered sounding PPDU. The steered sounding PPDU enables an AP/STA, receiving the steered sounding PPDU, to estimate an effective channel between the AP/STA and an AP/STA that send the steered sounding PPDU.

For example, in case of FIG. 4, the STA 2(410) sends a steered sounding PPDU to the AP 1(10). Here, a receiving matrix that may be obtained by decomposing (for example, SVD decomposition) a channel estimated between the AP 2(20) and the STA 2(410) may be used as the precoding matrix of a steered sounding PPDU which is transmitted to the STA 2(410) and the AP 1(10). That is, a steered sounding PPDU precoded as a receiving matrix in the channel between the AP 2(20) and the STA2(410) is transmitted to the AP 1(10) so that an effective channel between the AP 1(10) and the STA 2(410) is estimated and thus interference with the STA 2(410) is reduced.

Assuming that the channel between the AP 1(10) and the STA 2(410) is $H_1$ and the channel between the AP 2(20) and the STA 2(410) is $H_2$, a reception signal r received by the STA 2(410) may be represented by Equation 1 below.

$$r = H_2 P_2 x_2 + H_1 P_1 x_1 + n$$

In Equation 1, $P_1$ and $P_2$ mean the precoding matrices of signals transmitted from the AP 1(10) and the AP 2(20), respectively, to the STA 2(410), $x_1$ and $x_2$ mean data transmitted from the AP 1(10) and the AP 2(20) to the STA 2(410), and n means noise. Here, from a viewpoint of the STA 2(410), the signal $H_1 P_1 x_1$ transmitted by the AP 1(10) is a signal acting as interference and a signal to be received by the STA 2(410) is $H_2 P_2 x_2$.

The AP 2(20) may properly select the precoding matrix $P_2$ because it knows information about the channel the AP 2(20) and the STA 2(410). For example, if channel decomposition is used, the STA 2(410) may select the receiving matrix as $U_2$ and $P_2$ as $V_2$ as in Equation 2 below.

$$\begin{aligned} U_2^H r &= U_2^H H_2 P_2 x_2 + U_2^H H_1 P_1 x_1 + U_2^H n \\ &= U_2^H U_2 \Sigma V_2^H P_2 x_2 + U_2^H H_1 P_1 x_1 + U_2^H n \\ &= \Sigma x_2 + U_2^H H_1 P_1 x_1 + U_2^H n \end{aligned}$$

Here, it is preferred that a value of the signal $U_2^H H_1 P_1$ transmitted by the AP 1(10), acting as interference with the STA 2(410), be 0. The precoding matrix $P_1$ that makes the value of the signal $U_1^H H_1 P_1$ 0 has to be selected by the AP 1(10). In the state in which the AP 1(10) may estimate only the channel $H_1$ between the AP 1(10) and the STA 2(410), interference avoidance that makes the value of the signal $U_2^H H_1 P_1$ 0 (or minimizing interference so that the value becomes close to 0) is inevitably limited.

In order to solve this problem, it is necessary for the AP 1(10) to estimate an effective channel $U_2^H H_1$. The STA 2(410) sends a precoded sounding PPDU as $U_2^H$ to the AP1 (10) so that the AP 1(10) may estimate the effective channel $U_2^H H_1$.

Figure 7:
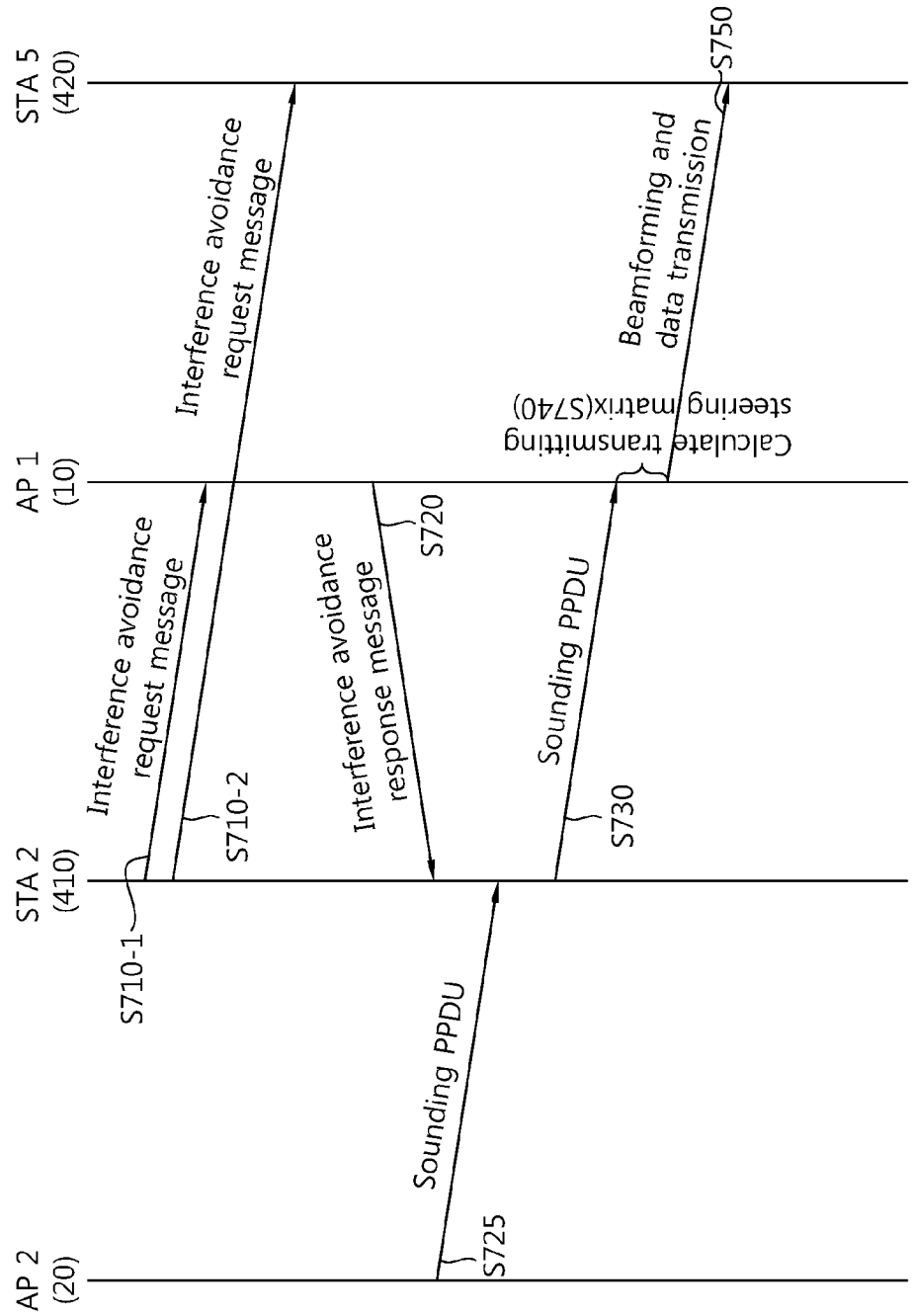
FIG. 7 is a message flowchart illustrating an embodiment of the present invention in which a steered sounding PPDU is transmitted.

FIG. 7 is a message flowchart illustrating an embodiment of the present invention in which a steered sounding PPDU is transmitted.

Referring to FIG. 7, like in the example of FIG. 5, the STA 2(410) sends an interference avoidance request message (S710-1 and S710-2), and the AP 1(10) sends an interference avoidance response message in response thereto (S720).

In the example of FIG. 5, the STA 2(410) sends a sounding PPDU to the AP 1(10) (S530). The AP 1(10) estimates a channel based on the sounding PPDU, forms a beam according to a calculated transmitting steering matrix (S540), and sends data to the STA 5(420) (S550). In contrast, in the present embodiment illustrated in FIG. 7, information about the effective channel is transmitted at step S730 corresponding to S530 so that the AP 1(10) may estimate an effective channel. An example in which information about the effective channel is transmitted includes an example in which a steered sounding PPDU is transmitted in FIG. 7. A precoding matrix multiplied with the steered sounding PPDU may be calculated on the basis of the sounding PPDU transmitted from the AP 2(20) to the STA 2(410). That is, the STA 2(410) obtains a receiving matrix on the basis of the sounding PPDU transmitted from the AP 2(20) to the STA 2(410) and sends a sounding PPDU steered by precoding the receiving matrix to the sounding PPDU transmitted to the AP 1(10).

Next, the AP 1(10) may form a beam in a direction that minimizes interference with the STA 2(410) through S740 and S750 corresponding to steps S540 and S550 of FIG. 5 through the steered sounding PPDU and send data.

The embodiment of FIG. 7 illustrates a method of the AP 1(10) obtaining information about an effective channel by receiving a steered sounding PPDU into which the information about the effective channel has been incorporated from the STA 2(410) and performing channel estimation. In accordance with another embodiment of the present invention, the information about the effective channel $U_2^H H_1$ may do not depend on the channel estimation of the AP 1(10), but the STA 2(410) may directly send the information about the effective channel $U_2^H H_1$ to the AP 1(10). Here, the information about the effective channel $U_2^H H_1$ may be transferred as quantized data. As another method, the same effect as that a steered sounding PPDU is transmitted may be obtained by sending the covariance value of a channel between the STA 2(410) and the AP 2(20) as information additionally compressed to $H_1$. That is, S730 of FIG. 7 may be replaced with a step of sending a frame including information about an effective channel and a step of sending the covariance value of a channel between the STA 2(410) and the AP 2(20) as information additionally compressed to $H_1$.

A condition that interference from the AP 1(10) cannot be reduced or the case where some of interference is sought to be selectively reduced if necessary may be assumed. In this case, a matrix indicating an interference subspace acting as the greatest interference with the STA 2(410) or a matrix for a signal to be selectively attenuated may be used as a receiving matrix, and a sounding PPDU of S730 steered by precoding the receiving matrix to a sounding PPDU may be sent to the AP 1(10).

Figure 8:
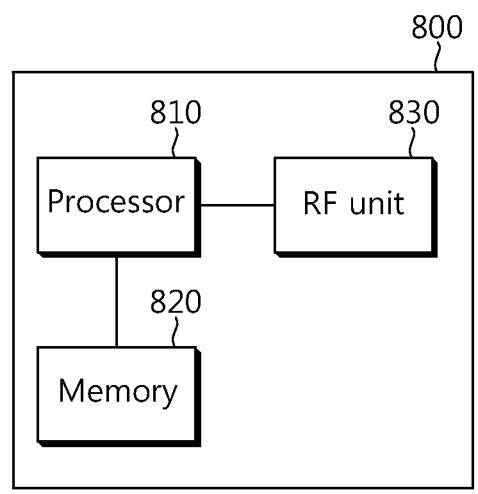
FIG. 8 is a block diagram showing an example of a wireless apparatus in which an embodiment of the present invention is implemented.

FIG. 8 is a block diagram showing an example of a wireless apparatus in which an embodiment of the present invention is implemented. The wireless apparatus 800 may be an AP or a non-AP STA.

The wireless apparatus 800 includes a processor 810, memory 820, and an RF unit 830. The RF unit 830 may transmit and receive radio signals and perform MIMO transmission or reception through multiple antennas. The processor 810 is coupled to the RF unit 830, and it implements the MAC layer and the physical layer of IEEE 802.11. When the processor 810 processes the operation of an AP in the above-described methods, the wireless apparatus 800 becomes the AP. When the processor 810 processes the operation of an STA in the above-described methods, the wireless apparatus 800 becomes the STA.

The MAC layer of the wireless apparatus implemented in the processor 810 supports the above-described interference avoidance methods, generates management frames necessary to implement the above-described interference avoidance methods, and send the frames through the RF unit 830 via a PLOP layer and a PMD layer. The MAC layer and the PHY layer supporting a link adaptation method according to the present invention may be modulated and implemented in one processor or a plurality of processors.

The processor 810 and/or the RF unit 830 may include Application-Specific Integrated Circuits (ASICs), other chipsets, logic circuits, and/or data processors. The memory 820 may include Read-Only Memory (ROM), Random Access Memory (RAM), flash memory, memory cards, storage media and/or other storage devices. When the embodiment is implemented in software, the above-described method may be implemented using a module (process or function) that performs the above functions. The module may be stored in the memory 820 and executed by the processor 810. The memory 820 may be placed inside or outside the processor 810 and connected to the processor 810 using a variety of well-known means.

The above embodiments include various aspects of examples. Although all possible combinations for describing the various aspects may not be described, those skilled in the art may appreciate that other combinations are possible. Accordingly, the present invention should be construed as including all other replacements, modifications, and changes which fall within the scope of the claims.

What is claimed is:

1. A method for avoiding an interference in a wireless local area network, the method comprising:
    transmitting, by a first station, an interference avoidance request message to a second station and a third station,
    wherein the interference avoidance request message informs that a frame transmission from the second station to the third station causes the interference to the first station;
    receiving, by the first station, an interference avoidance response message from the second station in response to the transmitted interference avoidance request message; and
    transmitting, by the first station, a sounding physical layer (PHY) protocol data unit (PPDU) to the second station,
    wherein the second station determines channel information about a channel between the second station and the third station,
    wherein the channel information is determined based on the sounding PPDU,
    wherein the sounding PPDU is a steered sounding PPDU that is pre-coded using a specific matrix received through a channel between the first station and a fourth station,
    wherein the second station calculates a steering matrix based on the channel information, and
    wherein the second station transmits data to the third station by performing a beamforming according to the calculated steering matrix.

2. The method of claim 1, wherein the first, second and third stations are an AP or non-AP STA of a neighboring basic service set (BSS).

3. The method of claim 1, wherein the interference avoidance response message includes at least one field among:
    a status field indicating a reception state of the interference avoidance request message;
    a capability field indicating whether interference avoidance capability exists or not; or
    a training request field indicating whether a sounding frame is requested to be transmitted for estimating the channel between the second station and the third station.

4. An apparatus for avoiding an interference in a wireless local area network, the apparatus comprising:
    an Radio Frequency (RF) unit; and
    a processor operatively coupled to the RF unit and configured to:
        transmit an interference avoidance request message from a first station to a second station and a third station,
        wherein the interference avoidance request message informs that a frame transmission from the second station to the third station causes the interference to the first station;
        receive an interference avoidance response message from the second station in response to the transmitted interference avoidance request message; and transmit a sounding physical layer (PHY) protocol data unit (PPDU) from the first station to the second station, wherein the second station determines channel information about a channel between the second station and the third station, wherein the channel information is determined based on the sounding PPDU, and wherein the sounding PPDU is a steered sounding PPDU that is pre-coded using a specific matrix received through a channel between the first station and a fourth station, wherein the second station calculates a steering matrix based on the channel information, and wherein the second station transmits data to the third station by performing a beamforming according to the calculated steering matrix.

5. The apparatus of claim 4, wherein the first, second and third stations are an AP or non-AP STA of a neighboring basic service set (BSS).

6. The apparatus of claim 4, wherein the interference avoidance response message includes at least one field among:

a status field indicating a reception state of the interference avoidance request message;

a capability field indicating whether interference avoidance capability exists or not; or a training request field indicating whether a sounding frame is requested to be transmitted for estimating the channel between the second station and the third station.

* * * * *